April 14, 1942.    G. F. NADEAU ET AL    2,279,410
ANTISTATIC LAYERS
Filed Feb. 18, 1941.

GALE F. NADEAU
WILLIAM O. KENYON
NORWOOD L. SIMMONS
INVENTORS

BY
ATTORNEYS

Patented Apr. 14, 1942

2,279,410

UNITED STATES PATENT OFFICE 2,279,410

ANTISTATIC LAYERS

Gale F. Nadeau, Norwood L. Simmons and William O. Kenyon, Rochester, N. Y., assignors to Eastman Kodak Company, Rochester, N. Y., a corporation of New Jersey Application February 18, 1941, Serial No. 379,458

11 Claims. (Cl. 95—9)

This invention relates to photographic film and more particularly to a film protected against static.

Considerable trouble has been experienced in the manufacture and use of photographic film due to the accumulation of electrical charges on the film. These electrical charges are known as static and are produced by the friction of the film moving over rollers or other surfaces. Manifestations of these charges are irregular fogged patterns in an emulsion of a film which has been developed. These static effects are particularly noticeable in a film provided with a cellulose nitrate support although in recent years with the advent of high speed emulsions practically any support will become sufficiently electrified during manufacture or use that the discharges of stored up static electricity will adversely affect the film. Attempts have been made to overcome static in films by the application of various layers to the film. These layers have in general consisted of materials designed to dissipate the electrical charges by providing the film with a conducting surface. Such materials are proteins, cellulose esters and hygroscopic salts. The usual procedure has been to coat a film with a solution of the material giving the static protection, the solvent of which attacks the support in such a manner that the antistatic layer is firmly anchored thereto.

The principal object of the present invention is to provide photographic film with backing layers rendering the film static-free. Another object is to describe the process of making a static-free film. Further objects will appear hereinafter.

These objects are accomplished in the present invention by providing a photographic film with a layer or layers of nitrogenous resins formed by the reaction of a resin having a maleic anhydride constituent with aromatic and aliphatic amines and diamines and ammonia or providing a film with layers of the salts or the imide forms of these resins.

Figure 1:
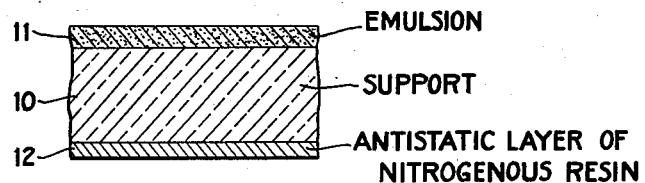
Figure 2:
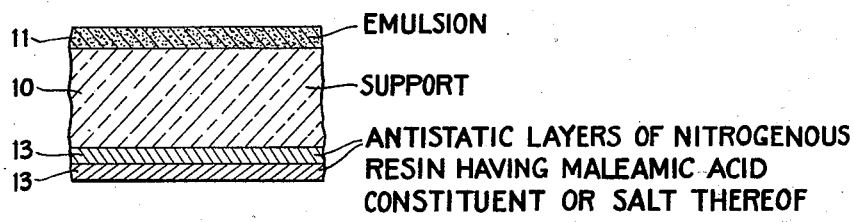
Figure 3:
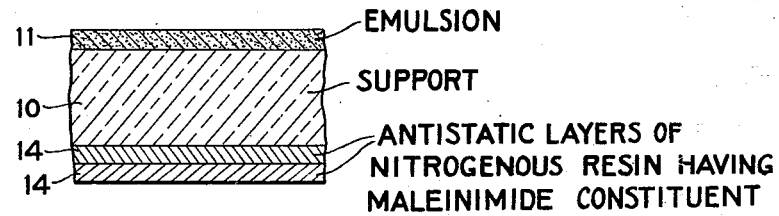

In the accompanying drawing Figs. 1, 2 and 3 represent enlarged sectional views of a film provided with the antistatic layers of the invention.

The method we use for providing a film with a satisfactory antistatic layer is to coat the back surface of a cellulose ester support, such as cellulose nitrate, with a thin layer of the nitrogeneous resins of the invention from a solvent for the support followed by a second layer of the resin coated from a solvent for the first layer but not for the support. This process has been described in application S. N. 373,971 filed January 10, 1941, by Norwood L. Simmons. We may, however, use only a single layer of nitrogenous resin to obtain adequate static protection.

The resins we use are those having a maleamic acid or maleinimide constituent or the salts thereof. By "maleamic acid constituent" we mean an amide derivative of maleic acid combined in a resin molecule. A "maleinimide constituent" denotes the imide of maleic acid combined in a resin molecule. The maleamic acid resins are prepared by polymerizing maleic anhydride with other polymerizable materials such as vinyl esters, vinyl ethers, styrene, unsaturated aliphatics and hydroaromatics, acrylic acids and esters, acid amides, vinyl ketones, etc., then reacting the polymers with aromatic and aliphatic amines or ammonia. The maleinimide resins are prepared by a dehydrating treatment.

The preparation of the resins of the invention has been described in a prior application, S. N. 302,208, filed October 31, 1939, by McDowell and Kenyon.

Examples of some of the resins we use for backing layers for film according to our invention are the following:

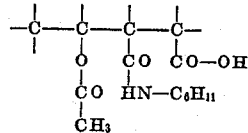

Vinyl acetate-N-cyclohexyl-maleamic acid resin

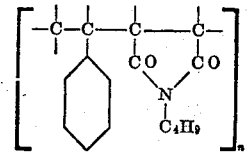

Styrene-N-butyl-maleinimide resin

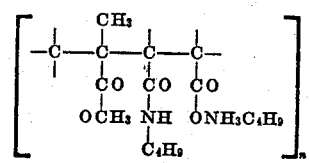

Butyl amine salt of methyl methacrylate-N-butyl-maleamic acid resin

The effectiveness of these resins in the prevention of static on photographic film may be seen by consideration of tests which have been made on film not protected against static, compared with films protected in the manner of the invention. A cellulose nitrate film base not especially static-protected developed a charge of −8.0 E. S. U. per sq. cm. in ½ minute whereas a film backed with a discrete layer of styrene-cyclohexyl maleamic resin developed a charge of only −1.2 E. S. U. per sq. cm. during the same time. Another film backed with a discrete layer of styrene-cyclohexyl maleinimide resin developed a charge of −1.7 E. S. U. per sq. cm. in that time. After the application of a second layer of the resins from a solvent for the first layer and not for the support a positive electro-static charge was developed on the film in ½ minute. The rate of development of the charge upon the film coated with resin was considerably lower than the rate of development of a negative charge on the unprotected film.

Our invention will now be described by particular reference to the accompanying drawing.

Fig. 1 illustrates a photographic film provided with an antistatic layer according to our invention, wherein a support 10 of a cellulose ester is coated on one side with a light sensitive emulsion layer 11, and on the opposite side thereof, with an antistatic layer 12 consisting of the nitrogenous resins of our invention.

Fig. 2 illustrates a photographic film provided with antistatic layers according to our invention wherein a support 10 of a cellulose ester such as cellulose nitrate is coated on one side with double layers 13 of resin having a maleamic acid constituent or layers of a salt of the resin. On the opposite side of the support is coated a light sensitive emulsion layer 11.

Fig. 3 illustrates a photographic film provided with antistatic layers, according to our invention wherein a support 10 of a cellulose ester such as cellulose nitrate is coated on one side with double layers 14 of resin having a maleinimide constituent. On the other side of the support is coated a light sensitive emulsion layer 11.

The following examples further describe our invention; however, these are in no way exhaustive of the supply of examples falling within the scope of our invention.

*Example 1*

A cellulose nitrate film base is coated with a layer of a styrene-cyclohexyl maleamic acid resin from a 0.8% solution of the resin in ethyl alcohol. After drying, a second coating may be laid over this from a 1% solution of the resin in ethylene chloride. A light sensitive emulsion is then coated onto the opposite side of the support using known subbing technique to obtain adhesion between the emulsion and the support. The solvents for the resin may be varied, as for instance in coating the first resin layer mixtures of acetone and ethylene dichloride may be used instead of alcohol.

*Example 2*

A cellulose nitrate film base is coated with a layer of a styrene-cyclohexyl maleinimide resin from a 2% solution of the resin in a mixture of 90% ethylene dichloride and 10% alcohol followed by a second coating from a 2% solution of the resin in ethylene dichloride. A light sensitive emulsion is coated on the opposite side of the support using any of the well known subbing techniques.

The antistatic layers of this invention are further characterized by consideration of their solubility in various reagents some of which are encountered in the manufacture and processing of film of the photographic type.

Ordinarily, the salts of the maleamic acid resins are soluble in water and dilute alkali, consequently, antistatic coatings of these salts are removable in washing operations to which a film is customarily subjected. However, a salt of a resin such as the styrene-cyclohexyl maleamic acid resin may be prepared having solubility characteristics such that a salt of this resin would be insoluble in aqueous solution. Such a salt is the cyclohexylammonium salt of the styrene-cyclohexyl maleamic acid resin. This is also true of the other types of resins having in their molecule a constituent other than styrene, in addition to a maleamic acid constituent.

The maleamic acid resins are usually insoluble in water and readily soluble in organic solvents and dilute alkali. Antistatic layers of these resins are normally removable in photographic developing solutions. In addition, while maleamic acid resins normally give alkali metal salts soluble in photographic processing solutions, they may, under certain conditions be salted out by constituents of the processing solutions and would then be removed from a film by subsequent washing operations.

Maleinimide resins are normally insoluble in water or alkaline solution and therefore are not removable in ordinary photographic processing solutions. An exception is a simple maleinimide resin, such as a vinyl ether-maleinimide resin prepared by the polymerization of vinyl ether with maleinimide which is, however, soluble in dilute alkaline solution due to the acid nature of the unsubstituted maleinimide residue, and may be used as a removable antistatic layer for photographic film.

Having thus described our invention we now state that we believe our invention to be capable of numerous variations and it is to be understood that our invention is to be limited only by the scope of the appended claims.

We claim:

1. A light sensitive photographic film which comprises a cellulose ester support, an emulsion layer, and a backing layer of a synthetic resin selected from the group of resins having the formula

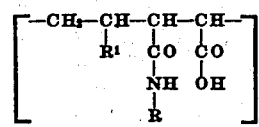

and

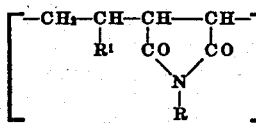

and the salts thereof, where R is a substituent selected from the group consisting of alkyl, aryl, hydrogenated aryl and alkyl-aryl, $R^1$ is a substituent selected from the group consisting of acyloxyl, alkoxyl, hydroxyl, aromatic, aliphatic, hydroaromatic, carboxyl, carboxylic ester, acid amide, halogen and acyl, and $n$ is a large integer.

2. A light sensitive photographic film which comprises a cellulose ester support, an emulsion layer, and a backing layer of a synthetic resin selected from the group of resins consisting of a resin having the formula

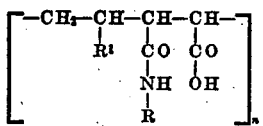

and the salts thereof, where R is a substituent selected from the group consisting of alkyl, aryl, hydrogenated aryl and alkyl-aryl, $R^1$ is a substituent selected from the group consisting of acyloxyl, alkoxyl, hydroxyl, aromatic, aliphatic, hydroaromatic, carboxyl, carboxylic ester, acid amide, halogen and acyl, and $n$ is a large integer.

3. A light sensitive photographic film which comprises a cellulose ester support, an emulsion layer, and a backing layer of a maleamic acid resin having the formula shown in claim 2: where $R^1$ is an acetoxyl group and R is a substituent selected from the group consisting of alkyl, aryl, hydrogenated aryl, alkyl-aryl and $n$ is a large integer.

4. A light sensitive photographic film which comprises a cellulose ester support, an emulsion layer, and a backing layer of a maleamic acid resin having the formula shown in claim 2: where $R^1$ is an acetoxyl group, R is a cyclohexyl group and $n$ is a large integer.

5. A light sensitive photographic film which comprises a cellulose ester support, an emulsion layer and a backing layer of a synthetic resin having the formula

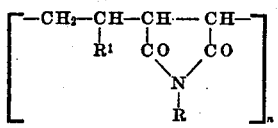

where R is a substituent selected from the group consisting of alkyl, aryl, hydrogenated aryl and alkyl-aryl, $R^1$ is a substituent selected from the group consisting of acyloxyl, alkoxyl, hydroxyl, aromatic, aliphatic, hydro-aromatic, carboxyl, carboxylic ester, acid amide, halogen and acyl, and $n$ is a large integer.

6. A light sensitive photographic film which comprises a cellulose ester support, an emulsion layer and a backing layer of a synthetic resin having the formula shown in claim 5: where $R^1$ is an aryl group, R is a substituent selected from the group consisting of acyloxyl, alkoxyl, hydroxyl, aromatic, aliphatic, hydroaromatic, carboxyl, carboxylic ester, acid amide, halogen, acyl and $n$ is a large integer.

7. A light sensitive photographic film which comprises a cellulose ester support, an emulsion layer and a backing layer of a synthetic resin having the formula shown in claim 5: where $R^1$ is phenyl, R is butyl and $n$ is a large integer.

8. A light sensitive photographic film which comprises a cellulose ester support, an emulsion layer and a backing layer of a salt of a synthetic resin having the formula shown in claim 2: where R is a substituent selected from the group consisting of alkyl, aryl, hydrogenated aryl and alkyl-aryl, $R^1$ is a substituent selected from the group consisting of acyloxyl, alkoxyl, hydroxyl, aromatic, aliphatic, hydroaromatic, carboxyl, carboxylic ester, acid amide, halogen and acyl, and $n$ is a large integer.

9. A light sensitive photographic film which comprises a cellulose ester support, an emulsion layer and a backing layer of an amine salt of a synthetic resin having the formula shown in claim 2: where R is a substituent selected from the group consisting of alkyl, aryl, hydrogenated aryl and alkyl-aryl, $R^1$ is a substituent selected from the group consisting of acyloxyl, alkoxyl, hydroxyl, aromatic, aliphatic, hydroaromatic, carboxyl, carboxylic ester, acid amide, halogen and acyl, and $n$ is a large integer.

10. A light sensitive photographic film which comprises a cellulose ester support, an emulsion layer and a backing layer of an amine salt of a synthetic resin having the formula shown in claim 2: where $R^1$ is a carboxylic methyl ester group and R is a substituent selected from the group consisting of acyloxyl, alkoxyl, hydroxyl, aromatic, aliphatic, hydroaromatic, carboxyl, carboxylic ester, acid amide, halogen, acyl and $n$ is a large integer.

11. A light sensitive photographic film which comprises a cellulose ester support, an emulsion layer and a backing layer of a synthetic resin having the formula shown in claim 2: where $R^1$ is carboxylic methyl ester, R is phenyl and $n$ is a large integer.

GALE F. NADEAU.
NORWOOD L. SIMMONS.
WILLIAM O. KENYON.